US012774428B2

(12) United States Patent
Hanson et al.

(10) Patent No.: US 12,774,428 B2
(45) Date of Patent: Oct. 27, 2026

(54) SCENT, SMELL AND ODOR CREATION FROM AN AROMAGRAPH

(71) Applicant: SUNTORY HOLDINGS LIMITED, Osaka (JP)

(72) Inventors: Chris Hanson, Sunnyvale, CA (US); William Harries, Boulder Creek, CA (US); Victor Todd Cushman, Wilmington, DE (US); Ed Costello, Pleasanton, CA (US)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 17/587,822

(22) Filed: Jan. 28, 2022

(65) Prior Publication Data

US 2022/0145212 A1 May 12, 2022

Related U.S. Application Data

(63) Continuation of application No. 16/271,713, filed on Feb. 8, 2019, now abandoned, which is a continuation of application No. 15/935,025, filed on Mar. 25, 2018, now abandoned.

(60) Provisional application No. 62/609,315, filed on Dec. 21, 2017.

(51) Int. Cl.
*C11B 9/00* (2006.01)
*A45D 34/02* (2006.01)
*G01N 30/00* (2006.01)

(52) U.S. Cl.
CPC ................ *C11B 9/00* (2013.01); *A45D 34/02* (2013.01); *G01N 30/00* (2013.01)

(58) Field of Classification Search
CPC ........................................................ C11B 9/00
See application file for complete search history.

(56) References Cited

U.S. PATENT DOCUMENTS

| | | | |
|---|---|---|---|
| 5,482,835 | A | 1/1996 | King et al. |
| 5,739,029 | A | 4/1998 | King et al. |
| 5,789,184 | A | 8/1998 | Fowlkes et al. |
| 5,876,951 | A | 3/1999 | Fowlkes et al. |
| 6,001,553 | A | 12/1999 | Broach et al. |
| 6,100,042 | A | 8/2000 | Fowlkes et al. |
| 6,159,705 | A | 12/2000 | Trueheart et al. |
| 6,168,927 | B1 | 1/2001 | King et al. |
| 6,251,605 | B1 | 6/2001 | Ostanin et al. |
| 6,255,059 | B1 | 7/2001 | Klein et al. |
| 6,325,475 | B1 | 12/2001 | Hayes et al. |
| 6,355,473 | B1 | 3/2002 | Ostanin et al. |
| 6,371,451 | B1 | 4/2002 | Choi |
| 6,504,008 | B1 | 1/2003 | Xu et al. |
| 6,555,325 | B1 | 4/2003 | Oehlen |
| 6,855,550 | B2 | 2/2005 | King et al. |
| 6,864,060 | B1 | 3/2005 | Fowlkes et al. |
| 7,022,513 | B2 | 4/2006 | Xu et al. |
| 7,081,360 | B2 | 7/2006 | Nadkarni et al. |
| 7,090,991 | B2 | 8/2006 | Oehlen |
| 7,105,309 | B2 | 9/2006 | Fowlkes et al. |
| 7,122,305 | B2 | 10/2006 | Klein et al. |
| 7,223,533 | B2 | 5/2007 | Ostanin et al. |
| 7,223,550 | B2 | 5/2007 | Dhanasekaran et al. |
| 7,235,648 | B1 | 6/2007 | Fowlkes et al. |
| 7,250,263 | B2 | 7/2007 | Klein et al. |
| 7,273,747 | B2 | 9/2007 | Manfredi et al. |
| 7,319,009 | B2 | 1/2008 | Klein et al. |
| 7,361,498 | B2 | 4/2008 | Fowlkes et al. |
| 7,416,881 | B1 | 8/2008 | Fowlkes et al. |
| 7,425,445 | B2 | 9/2008 | Matsunami et al. |
| 7,611,854 | B2 | 11/2009 | Fowlkes et al. |
| 7,691,592 | B2 | 4/2010 | Matsunami et al. |
| 7,838,288 | B2 | 11/2010 | Matsunami et al. |
| 7,879,565 | B2 | 2/2011 | Matsunami et al. |
| 8,298,781 | B2 | 10/2012 | Matsunami et al. |
| 9,400,766 | B2 | 7/2016 | Chee et al. |
| 9,611,308 | B2 | 4/2017 | Matsunami et al. |
| 10,209,239 | B1 | 2/2019 | Hanson et al. |
| 11,009,502 | B2 | 5/2021 | Hanson et al. |
| 11,092,599 | B2 | 8/2021 | Hanson et al. |
| 11,460,469 | B2 | 10/2022 | Hanson et al. |
| 2002/0132273 | A1 | 9/2002 | Stryer et al. |
| 2004/0101447 | A1 | 5/2004 | Tajima et al. |
| 2004/0235060 | A1 | 11/2004 | Dhanasekaran et al. |
| 2006/0009618 | A1 | 1/2006 | Devauchelle et al. |
| 2007/0054266 | A1 | 3/2007 | Sato et al. |
| 2007/0191257 | A1 | 8/2007 | Andretta et al. |
| 2008/0299586 | A1 | 12/2008 | Han et al. |
| 2009/0104072 | A1 | 4/2009 | Ando et al. |

(Continued)

FOREIGN PATENT DOCUMENTS

| | | | |
|---|---|---|---|
| CN | 1882689 | A | 12/2006 |
| CN | 101087879 | A | 12/2007 |

(Continued)

OTHER PUBLICATIONS

Abaffy, T., "Human olfactory receptors expression and their role in non-olfactory tissues—A mini review," J. Pharmacogen Pharmacoproteomics, 2015, vol. 6, No. 4, 7 pages.
Busse, D. et al., "A synthetic sandalwood odorant induces wound-healing processes in human keratinocytes via the olfactory receptor OR2AT4," J. Invest. Dermatol., 2014, vol. 134, pp. 2823-2832.
Cook, B.L. et al. "Large-scale production and study of a synthetic G protein-coupled receptor: Human olfactory receptor 17-4," PNAS, 2009, vol. 106, pp. 11925-11930.
Dewitt, N. et al. "GPCR Biosensor Chip," Nature Biotechnology. 1999, vol. 17, p. 1051.

(Continued)

*Primary Examiner* — Jessica Whiteley
(74) *Attorney, Agent, or Firm* — WHDA, LLP

(57) ABSTRACT

Disclosed here are methods and apparati for making a desired scent, smell, odor, aroma, and/or taste. Also disclosed herein are methods and apparati for making a scent, smell, odor, aroma, and/or taste that will produce a desired response in a desired group of subjects.

28 Claims, No Drawings

(56) References Cited

U.S. PATENT DOCUMENTS

| | | | |
|---|---|---|---|
| 2011/0059544 A1 | 3/2011 | Hong et al. |
| 2011/0177964 A1 | 7/2011 | Broach et al. |
| 2012/0021932 A1 | 1/2012 | Mershin et al. |
| 2012/0077210 A1 | 3/2012 | Trowell et al. |
| 2013/0216492 A1 | 8/2013 | Kato et al. |
| 2014/0324932 A1 | 10/2014 | Chee et al. |
| 2016/0091470 A1 | 3/2016 | Gafsou |
| 2017/0242004 A1 | 8/2017 | Hanson et al. |
| 2017/0364605 A1 | 12/2017 | Sobel et al. |
| 2019/0056382 A1 | 2/2019 | Hanson et al. |
| 2019/0194573 A1 | 6/2019 | Hanson et al. |
| 2019/0194574 A1 | 6/2019 | Hanson et al. |
| 2019/0293628 A1 | 9/2019 | Hanson et al. |
| 2020/0003774 A1 | 1/2020 | Hanson et al. |
| 2022/0099657 A1 | 3/2022 | Hanson et al. |

FOREIGN PATENT DOCUMENTS

| | | | |
|---|---|---|---|
| CN | 103097408 | A | 5/2013 |
| EP | 2031063 | A2 | 3/2009 |
| EP | 2957283 | A1 | 12/2015 |
| JP | 2015014531 | A | 1/2015 |
| WO | WO-0070343 | A2 | 11/2000 |
| WO | WO-0107094 | A1 | 2/2001 |
| WO | WO-0127158 | A2 | 4/2001 |
| WO | WO-02068473 | A1 | 9/2002 |
| WO | WO-2005051984 | A2 | 6/2005 |
| WO | WO-2007121512 | A1 | 11/2007 |
| WO | WO-2010085844 | A1 | 8/2010 |
| WO | WO-2014165818 | A2 | 10/2014 |
| WO | WO-2015102541 | A1 | 7/2015 |
| WO | WO-2016030378 | A1 | 3/2016 |
| WO | WO-2017147323 | A1 | 8/2017 |
| WO | WO-2019036432 | A1 | 2/2019 |
| WO | WO-2019126287 | A1 | 6/2019 |

OTHER PUBLICATIONS

Du, L. et al., "Functional expression of olfactory receptor and its application in biomimetic sensors," Chinese Science Bulletin, 2013, vol. 58, No. 36, pp. 3829-3838 (with English Summary).

Extended European Search Report for EP Application No. 18 891 757.9, mailed on Jul. 27, 2021, 9 pages.

Extended European Search Report for EP application No. 17757229.4, mailed on Aug. 20, 2019, 7 pages.

Extended European Search Report for EP Application No. 18 846 335.0, mailed on Mar. 18, 2021, 8 pages.

Extended European Search Report for EP Application No. 18846335.0, mailed on Feb. 4, 2022, 4 pages.

Ferrer, I. et al. "Olfactory receptors in non-chemosensory organs: the nervous system in health and disease," Front Aging Neurosci, 2016, vol. 8, Article 163, 17 pages.

Final Office Action for U.S. Appl. No. 15/441,062, mailed on Mar. 13, 2019, 7 pages.

Final Office Action for U.S. Appl. No. 15/441,062, mailed on Jun. 10, 2020, 11 pages.

Final Office Action for U.S. Appl. No. 15/935,025, mailed on Oct. 17, 2018, 14 pages.

Final Office Action for U.S. Appl. No. 16/271,713, dated Jan. 13, 2023, 15 pages.

Final Office Action for U.S. Appl. No. 16/271,713, mailed on Oct. 29, 2021, 14 pages.

Flegel, C. et al. "Expression Profile of Ectopic Olfactory Receptors Determined by Deep Sequencing," PLoS ONE, Ferbruary 2013, vol. 8, Issue 2, e55368, 19 total pages.

Foussat, A., "The digitalization of smells and tastes is transforming agri-food R&D," L'Atelier, Dec. 22, 2015, 4 pages, English translation located at https://web.archive.org/web/20151225203244/http://www.atelier.net:80/trends/articles/digitalisation-odeurs-gout-transforme-rd-de-agroalimentaire_439265#main.

Fukutani, Y. et al., "An improved bioluminescence-based signaling assay for odor sensing with a yeast expressing a chimeric olfactory receptor," Biotechnol. Bioeng., 2012, vol. 109, pp. 3143-3151.

Fukutani, Y. et al., "Improving the odorant sensitivity of olfactory receptor-expressing yeast with accessory proteins," Analytical Biochemistry, 2015, vol. 471, pp. 1-8.

Fukutani, Y. et al., "The N-Terminal Replacement of an Olfactory Receptor for the Development of a Yeast-Based Biomimetic Odor Sensor," Biotechnology and Bioengineering, 2011, vol. 109, No. 1, pp. 205-212.

Geithe, C., et al., "A Butter Aroma Recombinate Activates Human Class-I Odorant Receptors," Journal of Agricultural and Food Chemistry, 2015, vol. 63(43), pp. 9410-9420.

Gelis, L. et al., "Functional characterization of the odorant receptor 51E2 in human melanocytes," Journal of Biological Chemistry, 2016, vol. 291, No. 34, pp. 17772-17786.

Gendron, K.B. et al., "In vitro discrimination of tumor cell lines with an electronic nose," Otolarynology—Head and Neck Surgery, 2007, vol. 137, pp. 269-273.

Glatz, R. et al., "Mimicking nature's noses: From receptor deorphaning to olfactory biosensing," Progress in Neurobiology, 2011, vol. 93, pp. 270-296.

Greenwood, V., "You Smell Sick: Scientists are racing to create tests that can identify illness via odors in patients sweat, breath and urine," Scient Am Mind, 2016, vol. 27, p. 5.

Hallem, E.A., et al., "Coding of Odors by a Receptor Repertoire," Cell, 2006, vol. 125(1), pp. 143-160.

Hallem, E.A. et al., "Insect odor and taste receptors," Annu. Rev. Entomol., 2006, vol. 51, pp. 113-135.

Hanson, C.W. III et al., "Electronic nose prediction of a clinical pneumonia score: Biosensors and microbes," Anesthesiology, 2005, vol. 102, pp. 63-68.

Hashi, H. et al. "Modifying expression modes of human neurotensin receptor type 1 alters sensing capabilities for agonists in yeast signaling biosensor," Biotechnology Journal, 2012, vol. 13, Article ID 1700522, 11 pages.

Hockstein, N.G. et al., "Correlation of pneumonia score with electronic nose signature: A prospective study," Annals of Otology, Rhinology and Laryngology, 2005, vol. 114, No. 7, pp. 504-508.

International Search Report mailed on Dec. 7, 2018, for PCT application No. PCT/US2018/046636, filed on Aug. 14, 2018, 5 pages.—(002/001WO).

International Search Report mailed on May 1, 2019, for PCT application No. PCT/US2018/066430, filed on Dec. 19, 2018, 4 pages.—(004/001WO).

International Search Report mailed on May 8, 2017, for PCT application No. PCT/US2017/019179, filed on Feb. 23, 2017, 3 pages.—(001/001WO).

Jovancevic, N. et al. "Medium-chain fatty acids modulate myocardial function via a cardiac odorant receptor," Basic Research in Cardiology, 2017, vol. 11, No. 13, 20 pages.

Kamoun, E.A. et al. "A review on polymeric hydrogel membranes for wound dressing applications: PVA-based hydrogel dressings," J. Adv Res, 2017, vol. 8, pp. 217-233.

Ko, H.J. et al. "Specificity of odorant-binding proteins: A factor influencing the sensitivity of olfactory receptor-based biosensors," Bioprocess Biosyst. Eng., 2010, vol. 33, pp. 55-62.

Mainland et al., "Human olfactory receptor responses to odorants," Scientific Data, 2015, vol. 2, Article ID: 150002, 9 pages.

Malbon, C.C. "G Proteins in Development," Nature Reviews, Molecular Cell Biology, 2005, vol. 6(9), pp. 689-701.

Martins, S.A.M. et al. "Towards the miniaturization of GPCR-based live-cell screening assays," Trends in Biotechnology, 2012, vol. 30, pp. 566-574.

Minic, J. et al., "Functional expression of olfactory receptors in yeast and development of a bioassy for odorant screening," FEBS J. 2004, vol. 272, pp. 524-537.

Miranda-Lopez, R. et al., "Latest developments in the analysis of aroma compounds," Advances in Agriculutral and Food Biotechnology, 2006, pp. 175-192.

Misawa, N. et al., "Membrane protein-based biosensors," J. R. Soc. Interface, 2018, vol. 15, Article ID: 20170952, 17 pages.

(56) References Cited

OTHER PUBLICATIONS

Munakata, Y. et al., "Olfactory receptors are expressed in pancreatic β-cells and promote glucose-stimulated insulin secretion," Scientific Reports, 2018, vol. 8, No. 1499, pp. 1-11.
Nakamoto, T., "Trend of Human Olfactory Interface," Journal of the Japan Society for Precision Engineering, 2016, vol. 82, No. 1, p. 15-19 (Fig. 2a).
Non Final Office Action for U.S. Appl. No. 16/271,713, dated Jun. 1, 2022, 14 pages.
Non-Final Office Action for U.S. Appl. No. 15/441,062, mailed on Aug. 24, 2018, 13 pages.
Non-Final Office Action for U.S. Appl. No. 15/441,062, mailed on Sep. 27, 2019, 8 pages.
Non-Final Office Action for U.S. Appl. No. 15/927,083, mailed on Jun. 11, 2018, 10 pages.
Non-Final Office Action for U.S. Appl. No. 15/935,025, mailed on May 21, 2018, 11 pages.
Non-Final Office Action for U.S. Appl. No. 16/240,045, mailed on Jan. 30, 2020, 5 pages.
Non-Final Office Action for U.S. Appl. No. 16/271,713, mailed on Feb. 12, 2021, 16 pages.
Non-Final Office Action for U.S. Appl. No. 16/271,713, mailed on Jul. 14, 2020, 14 pages.
Non-Final Office Action for U.S. Appl. No. 16/572,351, mailed on Nov. 13, 2020, 9 pages.
Notice of Allowance for U.S. Appl. No. 15/441,062, mailed on Apr. 7, 2021, 8 pages.
Notice of Allowance for U.S. Appl. No. 15/927,083, mailed on Dec. 13, 2018, 10 pages.
Notice of Allowance for U.S. Appl. No. 16/240,045, mailed on Jan. 15, 2021, 5 pages.
Notice of Allowance for U.S. Appl. No. 16/572,351, mailed Feb. 14, 2022, 5 pages.
Pajot-Augy, E. et al., "Engineered yeasts as receptor systems for odorant deection," Journal of Receptors and Signal Transduction, 2003, vol. 23, Nos. 2 & 3, pp. 155-171.
Pavan, B. et al., "Potential therapeutic effects of odorants through their ectopic receptors in pigmented cells," Drug Disc Today, Jul. 2017, vol. 22, No. 7, pp. 1123-1130.
Saito, H., et al., "Odor Coding by a Mammalian Receptor Repertoire," Science Signaling, 2009, vol. 2(60), 28 pages.
Saito, H. et al., "RTP Family Members Induce Functional Expression of Mammalian Odorant Receptors," Cell, Nov. 2004, vol. 119, pp. 679-691.
Sasuga, S. et al., "The Reporter System for GPCR Assay with the Fission Yeast *Schizosaccharomyces pombe,*" Scientifica, 2012, vol. 2012, Article ID 674256, 11 pages.
Snider et al, Detecting interactions with membrane proteins using a membrane two-hybrid assay in yeast, 2010, Nat Protocol vol. 5, pp. 1281-1293.
Suter, B. et al., "Development and application of a DNA microarray-based yeast two-hybrid system," Nucl Acids Research, 2013, vol. 41, No. 3, pp. 1496-1507.
The Journal of the Institute of Image Information and Television Engineers, 2012, vol. 66, No. 6, p. 478-483 (Fig. 1a).
Written Opinion of the International Searching Authority mailed on Dec. 7, 2018, for PCT application No. PCT/US2018/046636, filed on Aug. 14, 2018, 6 pages.—(002/001WO).
Written Opinion of the International Searching Authority mailed on May 1, 2019, for PCT application No. PCT/US2018/066430, filed on Dec. 19, 2018, 5 pages.—(004/001WO).
Written Opinion of the International Searching Authority mailed on May 8, 2017, for PCT application No. PCT/US2017/019179, filed on Feb. 23, 2017, 6 pages.—(001/001WO).
Wu, L. et al. "Receptor-transporting protein 1 short (RTP1S) mediates translocation and activation of odorant receptors by acting through multiple steps," J. Biol. Chem., 2012, vol. 287, pp. 22287-22294.
Yamanaka, M. et al., "QCM Detection of GPCR-Ligand Binding Using Cell-Derived Liposomes," 17th International Conference on Miniaturized Systems for Chemistry and Life Sciences, Oct. 27-31, 2013, pp. 398-400.
Zhao, H. et al., "Functional expression of a mammalian odorant receptor," Science, 1998, vol. 279, pp. 237-242.
Zhuang, H., et al., "Evaluating Cell-Surface Expression and Measuring Activation of Mammalian Odorant Receptors in Heterologous Cells," Nature Protocols, 2008, vol. 3(9), pp. 1402-1413.
Zhuang, H. et al. "Synergism of accessory factors in functional expression of mammalian odorant receptors," J. Biol. Chem, 2007, vol. 282, pp. 15284-15293.

SCENT, SMELL AND ODOR CREATION FROM AN AROMAGRAPH

CROSS-REFERENCE TO RELATED APPLICATIONS

This application is a continuation of U.S. application Ser. No. 16/271,713, filed Feb. 8, 2019, which is a continuation of U.S. application Ser. No. 15/935,025, filed Mar. 25, 2018, now abandoned, which claims the benefit of U.S. Provisional Application Ser. No. 62/609,315, filed Dec. 21, 2017, the contents of which are incorporated herein by reference in their entireties.

BACKGROUND OF THE INVENTION

The olfactory receptor genes have been characterized through homology as seven transmembrane domain G protein-coupled receptors (GPCR). It is estimated that there are probably 500-750 olfactory receptor gene sequences in humans, while there are 500-1000 olfactory genes in rat and mouse. Mammalian Olfactory Receptors are concentrated on the surface of the mucus coated cilia and odorant molecules bind to the olfactory receptors in the olfactory epithelium. Since mammals can detect at least 10,000 odors and there are approximately 1,000 or fewer olfactory receptors, many odorants must interact with multiple olfactory receptors.

The discriminatory power of olfactory receptors is such that it can perceive thousands of volatile chemicals as having different odors. It is known that the olfactory system uses a combinatorial receptor coding scheme to decipher the odor molecules. One olfactory receptor can recognize multiple odorants and one odorant is recognized by multiple olfactory receptors. A slight structural change in the odorant or a change in the concentration of the odorant in the environment results in a change in the odor-code of these receptors.

Odor molecules belong to a variety of chemical classes including, for example, from alcohols, aldehydes, ketones and carboxylic acids to sulphur-containing compounds and essential oils. The physicochemical descriptors of odor molecules play an important role in the prediction of odor response by the olfactory receptor. Very identical olfactory receptor sequences can have a structural bias for ligand specificity on the basis of three dimensional shape, molecular charge, and/or the number of carbon atoms present in the ligands. About 8000 odorants have been identified in food. About 400 food odorants have been characterized and this number approximately equals the number of olfactory receptors found in humans. The response of mixtures of odorants is neither the additive nor an average of its components. Some mixtures lead to the emergence of novel perceptual qualities that were not present in the individual components.

SUMMARY OF THE INVENTION

The disclosure relates to methods and apparati for making a scent, smell, odor, aroma and/or taste. The scent, smell, odor, aroma, and/or taste can be modeled after a known and desired scent, smell, odor, aroma, and/or taste, or it can be a designer scent, smell, odor, aroma, and/or taste engineered to stimulate a desired set of Olfactory Receptors. The known or desired scent, smell, odor, aroma, and/or taste can also produce a desired response in a subject. The method uses Aromagraphs and/or digitized binding data of a desired odorant to one or more Olfactory Receptors and makes mixtures of components that mimic the Olfactory Receptor interactions of the desired odorant. Alternatively, the method is used to make a composition that produces a desired response in subjects by finding components that can produce a desired set of interactions at Olfactory Receptors which produce a desired response in subjects. The desired response in a subject can be a cognitive and/or behavioral response.

The methods and apparati described in the disclosure use Aromagraphs and/or digitized binding data to make desired scents, smells, odors, aromas, and/or tastes. Aromagraphs and/or digitized binding data can characterize odorant interactions with Olfactory Receptors (e.g., biosensors with Olfactory Receptors) as on (the biosensor produces a signal) or off (the biosensor does not produce a signal). Alternatively, the Aromagraph or digitized binding data can characterize an odorant's interaction with an Olfactory Receptor by binding affinity (e.g., $K_d$ the dissociation equilibrium constant, or other measure of affinity). The Aromagraph and/or digitized binding data can characterize odorant binding to an Olfactory Receptor using kinetic measures such as $C_{max}$ (maximum signal from the biosensor), $T_{max}$ (time to reach $C_{max}$), the minimum concentration of odorant that gives a signal from the biosensor, or kinetic constants for on and off binding. The Aromagraph and/or digitized binding data can measure the exposure of the Olfactory Receptor to odorant over time, for example, as expressed in Area Under the Curve (AUC) Aromagraphs and/or digitized binding data can be measured in real time, or interactions can be measured at multiple time points or a certain time.

The Aromagraph and/or digitized binding data can include data for the responses of panels of subjects to the odorants and/or components of odorants. Alternatively, the responses of panels of subjects to the odorants or components of odorants can be associated with the odorant and/or component in a database for that can include the Aromagraph and/or digitized binding data. Subject responses can be scored in any way including for example, cognitive responses, behavioral responses, positive emotional responses, or negative emotional responses. Subject responses can also include demographic characteristics of the subjects such as geography, age, income, education, nationality, religion, ethnicity, and other socioeconomic factors that are correlated with related experiences (e.g., related experiences during childhood and adolescence). Related subject responses to odorants can be correlated with demographic characteristics or other aspects of the subjects that are related to common experiences of subjects when they were exposed to the odorant.

A desired odorant can be made using the desired odorants Aromagraph and/or digitized binding data. The Aromagraph for the desired odorant shows the binding interactions of the odorant with a repertoire of Olfactory Receptor biosensors. Compositions that mimic these odorant interactions with the repertoire of Olfactory Receptors can be found empirically by measuring the interaction of components and/or other odorants with a repertoire of Olfactory Receptor biosensors. Components and/or other odorants can be combined into a composition that mimics the Aromagraph and/or digitized binding data of the desired odorant. The composition can optionally be tested with a panel of subjects and compared to the response for the desired odorant.

The methods and apparati of the disclosure can use a library of components and/or odorants which library is associated with a database of Aromagraphs and/or digitized binding data for the library members. The database can also include (as part of the Aromagraph or as a separate entry) the response of subjects to the component and/or odorant. The subject responses can include subject responses by geography, age, income, education, nationality, religion, ethnicity, other socioeconomic and/or demographic factors correlated with common experiences, and/or combinations of these factors. Using such a database, compositions can be designed to produce a desired response from subjects by producing an Aromagraph that correlates with the desired response. Similarly, an odorant that produces a desired response in a desired group of subjects can be mimicked using the database and the library to make a composition that produces art Aromagraph like that of the desired odorant.

The disclosure also relates to an apparatus for making a scent, smell, odor, aroma, and/or taste. This apparatus is associated with and uses the library of components and/or odorants, and the database of Aromagraphs and/or digitized binding data and subject responses (e.g., by demographic group). In an aspect, the apparatus uses the information in the database to design a composition with an Aromagraph and/or digitized binding data that mimics the Aromagraph and/or digitized binding data of the desired odorant. The mimicked Aromagraph and/or digitized binding data can also be one that is associated with a desired response from a desired group of subjects.

The apparatus for making a scent, smell, odor, aroma, and/or taste can include a computer readable storage medium, a data processing unit, a component handling system, a mixing system, a volatilization system, and a delivery apparatus. The data processing unit calculates a combination of components that have an Aromagraph and/or digitized binding data that mimics the Aromagraph and/or digitized binding data for the desired odorant. Alternatively, the data processing unit can calculate a combination of components that can produce a desired response from a desired group of subjects. The data processing unit communicates the combination of components to the component handling system which delivers this combination of components (and the amount of each component) from the library to the mixing system. The mixing system receives instructions from the data processing unit to combine the components (and the amounts) into a composition. The mixing system then provides the composition to the volatilization system that turns the composition into a vapor, aerosol, or combination of vapor and aerosol. The volatilized composition is provided to the delivery apparatus that provides the volatilized composition to a subject.

The apparatus for making scents, smells, odors, aromas, and/or tastes can be used with virtual reality systems to enhance the virtual reality experience. The content running on the virtual reality system can send instructions to the apparatus to make scents, smells, odors, aromas, and/or tastes at desired times as part of the delivery of virtual reality content to an end user. The content running on the virtual reality system can send the apparatus a recipe for a composition to be made from the library, or instructions to make a composition that mimics an Aromagraph and/or digitized binding data, or instructions to make a composition that will produce a desired response for a desired group of subjects (e.g., using demographic information to define the group of subjects). The apparatus processes the instructions from the virtual reality system and produces a volatilized composition that is provided to the end user by the delivery apparatus.

Other gaming systems can also be used with the apparatus for making scents, smells, odors, aromas, and/or tastes in an analogous manner with other gaming systems sending instructions to the apparatus for the delivery of volatilized compositions to an end user at desired times. Similarly, the apparatus for making scents, smells, odors, aromas, and/or tastes can be used with other entertainment delivery devices such televisions, computers, pad devices, phones, etc. to provide scents, smells, odors, aromas, and/or tastes at desired times as one of these devices provides entertainment or other content to an end user.

The apparatus for making scents, smells, odors, aromas, and/or tastes can be used in recreational settings such as, for example, gyms, theatres, arcades, amusement parks, casinos, etc. The apparatus can be configured to produce scents, smells, odors, aromas, and/or tastes which enhance the entertainment experience of the venue. For example, a gym could use the apparatus to produce scents, smells, odors, and/or aromas which make the user alert and energetic. A theatre could incorporate scents, smells, odors, and aromas into plays and/or movies. Amusement parks could incorporate the apparatus into its rides and attractions Amusement parks could also use the apparatus to produce aromascapes in certain areas of the part such as, for example, food courts or eateries.

The apparatus for making scents, smells, odors, aromas, and/or tastes can also be used in the home to provide desired aromascapes and/or desired responses for the user in the home. A home user can program the apparatus to produce scents, smells, odors, or aromas that can enhance a social event held in the home, or relax the user when that is desired. The apparatus can also be used for marketing a home by creating an aromascape that matches the staging of the home for viewing by brokers, realtors and prospective buyers, e.g., during open houses or broker property tours.

The apparatus for making scents, smells, odors, aromas, and/or tastes can be used in work settings to enhance the work environment desired by the employer. For example, productivity can be enhanced by certain scents, smells, odors and aromas that in general promote positive moods in workers and can improve, for example, concentration, mental clarity, reaction time, and/or lower anxiety and stress. Conversely, an employer may wish to use scents, smells, odors, and/or aromas to produce other responses that are desired. Work place scents, smells, odors and/or aromas can also cycle overtime to produce desired responses at different times (e.g., at different times of a day or week). For example, improved productivity can be associated with different scents, smells, odors, and/or aromas at different times of the day. Alternatively, the amount of the same scent, smell, odor, and/or aroma can be cycled in an environment to reduce receptor saturation. Such cycling of the amount of the odorant and/or composition can produce on and off stimulus to the olfactory receptors allowing the subject to respond to the odorant and/or composition with reduced (or minimal) receptor saturation and/or down regulation, and/or reduced (or minimal) tolerance and/or down regulation of response to receptor stimulation.

The apparatus for making scents, smells, odors, aromas, and/or tastes can be used in commercial settings to market goods and services. The apparatus can be used to make aromascapes that produce desired responses when shoppers view and/or enter a product and/or service area or view a product and/or service display. The apparatus for making scents, smells, odors, aromas, and/or tastes can also be used in the branding of new (or old) products and/or services.

The apparatus can be used for quality control and quality assurance testing where the apparatus makes a desired scent, smell, odor, aroma, and/or taste which is compared in a QC/QA step to a product. The scent, smell, odor, aroma, and/or taste can be a standard to which products in production are tested as they move through the production process. Randomly selected products can be taken from the production line at key production steps and can be compared to the scent, smell, odor, aroma, and/or taste produced from the apparatus. Changes from the standard sample can be monitored and measured and decisions to accept or reject the production run can be made or remedial actions can be taken to correct the differences demonstrated in the production run.

The apparatus can also be used for the treatment disease and disorders. For example, the apparatus could be used to treat psychology and psychiatric disorders in a clinical or out-patient setting such as, post-traumatic stress disorder (PTSD), or other disorders where reconstructing a scent scenario could aid in treatment. The apparatus can be used in training of people or animals. The apparatus can be used in scent decoying in agriculture, hunting, fishing, pest control, etc.

DETAILED DESCRIPTION OF THE INVENTION

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

Definitions

As used herein, an "Aromagraph" refers to a digital representation of the response to an odorant by an Olfactory Receptor or a repertoire of Olfactory Receptors.

As used herein, a "component of an odorant" refers to a molecule or molecules of an odorant which odorant is made up of multiple different molecules (and/or elements). A component is a subpart of the odorant that when combined with other subparts makes the composition which is the odorant.

As used herein, an "effective amount" refers to an amount of a compound, formulation, material, or composition, as described herein effective to achieve a particular biological result.

As used herein, the term "heterologous" refers to two or more components that are not normally found in the same relationship to each other in nature. For instance, a nucleic acid can be recombinantly produced, having two or more sequences, e.g., from unrelated genes arranged to make a new functional nucleic acid. Similarly, a "heterologous" composition refers to two or more molecules that are not found in the same relationship to each other in nature.

As used herein, the term "library" means a collection of components and/or odorants. A library can contain odorants and/or components that have similar or related interactions with a repertoire of Olfactory Receptors.

As used herein, the term "naturally occurring" means that the components are found in a composition that pre-exists in an organism.

As used herein, an "odorant" refers to any substance or composition that can be detected by at least one Olfactory Receptor.

As used herein, the terms "Olfactory Receptor" or "OR" are used interchangeably herein to refer to olfactory receptors, trace amine associated receptors, vomeronasal receptors, formyl peptide receptors, membrane guanylyl cyclase, subtype GC-D receptors, and G-protein coupled taste receptors. Olfactory Receptors also include hybrid receptors made from olfactory receptors, trace amine associated receptors, vomeronasal receptors, formyl peptide receptors, membrane guanylyl cyclase, subtype GC-D receptors, and G-protein coupled taste receptors Olfactory Receptors include, at least, ectopic Olfactory Receptors and Olfactory Receptors in the nasal cavity.

As used herein, the term "real time" refers to taking multiple measurements during a reaction or interaction as opposed to making a single measurement at the end of the reaction, or at a specified time point. Real time measurements are often used to quantitate the amount of a component in a sample, or to provide relative quantification of two or more components in a sample. Real time measurements can also be used to determine kinetic parameters of a reaction or interaction. Real time measurements can be used to characterize the interaction of a component and/or an odorant with an Olfactory Receptor.

As used herein, the term "repertoire" refers to a group of genes encoding a plurality of different Olfactory Receptors or to the polypeptides which are the plurality of different Olfactory Receptors. The repertoire may represent all of the Olfactory Receptors of a species, e.g., human, dog, or cat. Alternatively, the repertoire may represent the Olfactory Receptors that detect a taste, scent, smell, aroma, and/or odor. The repertoire may also represent the Olfactory Receptors that detect a desired, pleasing, arousing, or adverse taste, scent, smell, aroma, and/or odor. The repertoire may represent the Olfactory Receptors of a class, family, type, or other desired group of Olfactory Receptors. The repertoire may also be a group of Olfactory Receptors chosen for a desired purpose.

As used herein, the term "subject" is defined to mean a biological entity. The biological entity is an organism that has Olfactory Receptors. The subject can be a mammal, reptile, amphibian, bird, etc. The mammal can be a human. The human may be diagnosed or suspected of being at high risk for a disease.

As used herein, the term "taste receptors" refers to G-protein coupled taste receptors for detecting sweet, bitter, and umami (glutamate), and ion channels and ionotropic receptors for detecting salty and sour.

The singular terms "a," "an," and "the" include plural referents unless context clearly indicates otherwise. Similarly, the word "or" is intended to include "and" and vice-versa unless the context clearly indicates otherwise Numerical limitations given with respect to concentrations or levels of a substance, such as an antigen, are intended to be approximate. Thus, where a concentration is indicated to be at least (for example) 200 μg, it is intended that the concentration be understood to be at least "approximately about" or "about" 200 μg.

Aromagraphs and Digitized OR Binding Data

An Aromagraph is digitized data for odorant binding at one or more Olfactory Receptors. Such data can be obtained from Olfactory Receptor biosensors, such as those described in U.S. patent application Ser. No. 15/441,062 filed on Feb. 23, 2017, which is incorporated by reference in its entirety for all purposes. Aromagraphs and/or digitized binding data can represent odorant binding at one or more Olfactory Receptors and can be expressed as on/off data, binding affinity, maximal signal, time to maximum signal, area under the curve, kinetics for on and off binding, etc. Aromagraph data and/or digitized binding data can be obtained at a set time, or measured in real time or over time. Aromagraph data and/or digitized binding data can reflect responses from the reporter of the biosensor and/or can be comparative data that is quantitated against a reference. The reference can be a G-protein coupled receptor with a known affinity for a known ligand. The reference can also be a reporter that has a known and described expression. This reference reporter can be expressed in the same cell with the biosensor.

Aromagraphs and/or digitized Olfactory Receptor binding data can be used to identify a scent, smell, odor, aroma, and/or taste. An Aromagraph and/or digitized Olfactory Receptor binding data can be used to uniquely identify a scent, smell, odor, aroma, and/or taste. An Aromagraph and/or digitized Olfactory Receptor binding data can be used to describe a scent, smell, odor, aroma, and/or taste. For odorants that have more than one component, Aromagraphs and/or digitized binding data can be used to characterize the Olfactory Receptor interactions of the individual components, and the interaction of the individual components can be modeled using the Aromagraph and/or digitized binding data information of the components to give the composite Aromagraph and/or digitized binding data of a complex odorant.

Aromagraph data and/or digitized binding data for a plurality of odorants and odorant components can be used to make a database of components and odorants from which desired odorants can be made. The database of odorants and components can also include scoring of the odorants by panels of subjects. Such scoring can measure the subjective response of subjects to odorants and can characterize subject response to odorants based on geographic location, age, sex, income, other socio-economic factors, race, nationality, etc. of the subjects. The subject response could grade the odorants based on categories such as, for example, happiness/well-being (pleasant, pleasant surprise, amusement, attracted, well-being, happiness, nostalgic, salivating), awe/sensuality (admiration, in love, desire, feeling awe, excited, romantic, sensual, sexy), disgust/irritation (disgusted, unpleasant, unpleasant surprise, angry, dissatisfaction, irritated, sickening, dirty), soothing/peacefulness (soothed, light, clean, relaxed, serene, reassured), energizing/refreshing (energetic, refreshed, revitalized, stimulated, invigorating, shivering), delicacy (pleasant, attractive, beneficial, carnal, delicate, discrete, distinguished, soft, elegant, erotic, feminine, harmonious, light clean, refined, reassuring, romantic, seducing, sensual, sophisticated, subtle, voluptuous), heaviness (animal, unpleasant, foul, heavy, nauseous, penetrating, stinky, dirty, persistent), healthiness (dynamic, fresh, spring-like, clean, pure, invigorating, healthy, tonic) and sweet (mouth-watering, childish). Subject response to components and odorants can also include a time component to assess whether the subjects response to the component or odorant changes over time as the subject is exposed to the odorant or component.

Subject responses can also include demographic information on the subjects such as, for example, sex, sexual orientation, age, income, residence, historical residences (or geographic location), ethnicity, nationality, and other demographic or socioeconomic factors. These demographic and/or socioeconomic factors can correlate with common experiences of the subjects when the subjects were exposed to odorants. Olfaction is tied to associative learning and emotional processing as the olfactory bulbs are part of the limbic system and are directly connected to the amygdala (emotion processing) and the hippocampus (associative learning). Thus, subjects who share common experiences when exposed to scents, smells, odors, aromas and/or tastes are likely to have similar responses. Many scent, smell, odor, aroma, and/or taste responses are formed during childhood so obtaining demographic and socioeconomic data on subject's childhoods can be important to correlating responses for subjects.

Using an Aromagraph to Make a Scent, Smell, Odor, Aroma and/or Taste

An Aromagraph and/or digitized binding data or group of Aromagraphs and/or digitized binding data that have a desired subject response profile (e.g., response for happiness/well-being, awe/sensuality, soothing/peacefulness, energizing/refreshing, delicacy, and/or healthiness) can be used to make a scent, smell, odor, aroma, and/or taste that will have a desired response in a desired group of subjects (sharing traits measured in the database, e.g., geographic location, socioeconomic status, sex, age, etc.). Aromagraphs and/or digitized binding data can characterize Olfactory Receptor interactions at a plurality of Olfactory Receptors as on/off data, binding affinity, maximal signal, time to maximum signal, area under the curve (AUC), etc. Using components and odorants from the database, one can construct in silico a composition that mimics the desired Aromagraph and/or digitized binding data. The in silico derived compositions can then be tested against a plurality of Olfactory Receptor biosensors to measure the Aromagraph and/or digitized binding data of the new composition. Comparison of the new Aromagraph and/or digitized binding data to the desired Aromagraph and/or digitized binding data can be done to calculate a closeness measure of the two Aromagraphs and/or digitized binding data.

Odorants that produced a desired response (e.g., happiness/well-being, awe/sensuality, soothing/peacefulness, energizing/refreshing, delicacy, healthiness, and/or a combination of the foregoing) from a panel of subjects can be selected for scent reproduction. Alternatively, a database of odorant Aromagraphs and/or digitized binding data with subject responses can be used to select a combination of components and/or odorants which can produce a desired response in a set of subjects. The database and library of odorants can include agonists, antagonists and allosteric regulators of Olfactory Receptors. In an aspect, a combination of components and/or odorants can be made where different groups of subjects have a common response to different components and/or odorants of the composition (based upon the experiences of the subjects in the different groups). Such a composition, of components and/or odorants can produce a desired response in larger group or population of subjects by mixing the components and/or odorants that produce the common response in different subjects. Aromagraphs and/or digitized binding data for the odorant to be reproduced can be used to make a designed composition using components that are combined to make a composite Aromagraph and/or digitized binding data that is similar to or the same as the Aromagraph and/or digitized binding data of the odorant to be reproduced. For example, Aromagraphs and/or digitized binding data that score Olfactory Receptor interactions as on/off signals can be used to find combinations of components and odorants from a database which provide the same on/off signal pattern as the Aromagraph and/or digitized binding data from the odorant to be reproduced. These combinations can combined odorants to produce the same on/off pattern as the desired odorant and can include antagonists and/or allosteric regulators that modify the Aromagraph of the composite to be the same as or close to the desired Aromagraph. More detailed Aromagraphs and/or digitized binding data for the odorant to be reproduced can measure Olfactory Receptor interactions by binding characteristics such as, for example, affinity, maximum signal, time to maximum signal, or AUC. These more detailed Aromagraphs and/or digitized binding data can be used to screen candidates from the pool of on/off Aromagraph compositions for compositions that produce predicted Aromagraphs and/or digitized binding data that match the more detailed Aromagraph and/or digitized binding data for the odorant to be reproduced.

Software algorithms applied to the library of Aromagraphs may be used to create a ranked list of candidate Aromagraphs or combinations of Aromagraphs which will most closely match the desired target scent.

An Apparatus for Making a Scent, Smell, Odor, Aroma and/or Taste

The apparatus can include a computer readable storage medium, a data processing unit, a component handling system, a mixing system, a volatilization system, and a delivery apparatus. Alternatively, the storage medium for at least some information can be cloud based and the apparatus accesses this cloud based information using a communication system (e.g., a modem, Bluetooth, or wifi communications device). The computer readable storage medium can include the database of Aromagraph and/or digitized binding data for the library of components and/or odorants, and optionally the database can include subject responses to the components and/or odorants happiness/well-being, awe/sensuality, soothing/peacefulness, energizing/refreshing, delicacy, healthiness, and/or a combination of the foregoing) including demographic information associated with the responses. The computer readable storage medium includes, for example, any commercially available memory devices for storing information such as flash drives (Sandisk), hard disk drives (Seagate), magnetic storage devices (HP or Sony), and optical disks (Sony or LG). The data processing unit is configured to calculate the Aromagraph or digitized binding data for a composition made from components and/or odorants from the library, and the data processing unit is configured to compare the calculated Aromagraph and/or digitized binding data to the desired Aromagraph and/or digitized binding data. The data processing unit can include, for example, any commercially available central processing unit (such as CPUs sold by Intel or AMD) programmed with software for analyzing the Aromagraph and/or digitized binding data from the database.

The component handling system accesses the components and/or odorants in the library and provides desired amounts of the components and/or odorants to the mixing system. The component handling system can be robotic, a fluidics system, or a combination of these two. The mixing system combines the components into solutions and/or suspensions which are provided to the volatilization system. The volatilization system produces vapors or aerosols of the composition which are provided to the delivery apparatus.

The component handling system can include storage for the various components from which scents, smells, odors, aromas, and/or tastes can be made. Components can be stored in the apparatus as solutions, suspensions, solids, or gases. The solutions and/or suspensions can be made with a solvent (e.g., water) and suitable GRAS (generally regarded as safe) materials (e.g., ethyl alcohol, acetate, phosphate buffers, PEG) and/or other suitable excipients (see, e.g., Remington's Pharmaceutical Sciences (Mack Pub Co., N.J. 1991), Remington's The Science and Practice of Pharmacy, $22^{nd}$ Edition (Pharmaceutical Press 2013), which are incorporated herein by reference in their entirety for all purposes). The component handling system also has materials handling components for mixing components to be made into a vapor or aerosol. Once mixed, the mixture can be turned into a vapor or an aerosol. The apparatus can include fluidic channels, valves and other components for handling the solutions and suspensions of the components.

The volatilization system can produce vapors and/or aerosols of the various components in a composition that mimics the odorant to be reproduced. A vapor of some components can be made by heating the component to the temperature at which the component becomes a gas (e.g., sublimation or boiling temperature). The component handling system can store vapor components as solids (components that sublime) and/or liquids and/or gases. When a composition calls for one of these components, the component is retrieved by the component handling system that provides the component to the mixing system. The mixing system combines the components with other components and this mixture is provided to the volatilization system. In this example, the volatilization system can utilize a heating receptacle where the component are heated to become a vapor. The vapor is provided to the delivery apparatus that delivers the vapor to the subject. The amount of vapor released can be controlled by the amount of liquid/solid component placed into the heating receptacle and the amount of gas released from the delivery apparatus, Vapor production can also be controlled over time so that specific amounts of odorants are volatilized at specific times and the end user is exposed to varying amounts of odorant over time. In some aspects, components which are vapors or that can be vaporized are processed separate from the components for aerosols, and the system combines the vapor(s) and the aerosols prior to delivery to the user.

Components can be released as an aerosol using, for example, an aerosol dispensing system, nebulizers, ink-jet printer technology, etc. Aerosol dispensing systems can use a propellant that usually has a boiling point near room temperature so that in the pressurized vessel the propellant exists as both a gas and a liquid. The payload to be delivered in the aerosol can be miscible with liquid propellant, or it can be suspended in the propellant. When the propellant is released from the pressurized vessel the propellant forms a mist containing the payload (component). Nebulizers use compressed air or ultrasonic power to break-up a solution or suspension of a solvent and the payload into small droplets that form a mist that can be inhaled. Jet nebulizers use compressed air or oxygen as a propellant that flows at a high velocity through a liquid solution or suspension to make an aerosol that can be inhaled. Ink-jet printer heads heat solutions with a resistor to form a bubble that is used to make and propel an aerosol. Ink-jet technology can be used to make vapors from components that can be heated to a gas, and to make aerosols of those components that cannot be heated to a vapor but can be made into an aerosol.

The apparatus for making a scent, smell, odor, aroma, and/or taste can also include a delivery apparatus (or mechanism). The delivery apparatus (or mechanism) can be, for example, a tube, mask, cannula, nozzle, diffuser, atomizer, evaporator, fan, or other device that presents the aerosol and/or vapor to the user or the environment of the user.

The apparatus for making a scent, smell, odor, aroma, and/or taste receives a recipe for a desired mixture and then makes the mixture from the stored components. This mixture (or mixtures) are then made into aerosols and/or vapors. The aerosol and/or vapors of the designed scent, smell, odor, aroma, and/or taste can then be delivered to a user.

Virtual Reality Platforms

Scents, smells, odors, aromas and/or tastes made from components of the library, and which components are mixed to recreate the desired aromagraph, can be released as a vapor and/or aerosol from the apparatus for making a scent, smell, odor or aroma in conjunction with a virtual reality platform. The apparatus for making a scent, smell, odor or aroma can be connected to a delivery apparatus that delivers the vapor and/or aerosol to the user of the virtual reality system.

Commercially sold virtual reality systems can be used with the apparatus for making a scent, smell, odor, aroma and/or taste. Such VR systems include, for example, the Facebook Oculus Rift platform, Oculus Gear VR platform, the Google Daydream platform including the VIVE standalone headset with Daydream, the Lenovo standalone headset with Daydream, and the Daydream view for Smart Phones, the HTC VIVE platform, Sony Playstation® VR platform, and Osterhout Design Group smartglasses models, R8 and R9 (extended reality glasses). The apparatus for making a scent, smell, odor or aroma can be configured to be a component of any of these platforms so that desired scents, smells, odors or aromas can be delivered in conjunction with the programs (games, etc.) that are running on the respective VR platforms.

The delivery apparatus can be configured to be detachable from the head mounted VR display. The delivery apparatus can be detachably mounted to the head mounted display using any suitable means for attaching the delivery apparatus including, for example, an adhesive, a screw, Velcro (hook and loop fasteners), a strap which optionally can be closed using Velcro, or a mating attachment that snaps or joins together with a complementary attachment on the head mounted display. Alternatively, the apparatus for making scents, smells, odors, aromas, and/or tastes can produce scents, smells, odors and/or aromas that are introduced into a room or gaming environment so that a group of users (users and viewers) can experience the scent, smell, odor, and/or aroma during the viewing of the content. The apparatus for making scents, smells, odors, aromas, and/or tastes can communicate wirelessly or through a wire with the VR gaming system.

Uses of Aromagraph Scents, Smells, Odors, Aromas and/or Tastes

VR systems can be combined with the apparatus for making scents, smells, odors, aromas and/or tastes to include desired scents, smells, odors, aromas and/or tastes as part of the content presented on the VR system. The apparatus for making a scent, smell, odor, aroma and/or taste receives instructions from the VR program that instructs the apparatus to make a particular scent, smell, odor, aroma and/or taste. The apparatus combines the components from its library to make the desired scent, smell, odor, aroma and/or taste and this composition is volatilized by the apparatus as vapors and/or aerosols which are presented to the user by a delivery mechanism of the apparatus. Using the apparatus for making a scent, smell, odor, aroma and/or taste, the VR program (e.g., a game) can include scents, smells, odors, aromas and/or tastes as part of the presentation of content to the user.

In a similar way, the apparatus for making scents, smells, odors, aromas and/or tastes can be combined with other gaming systems so that scents, smells, odors, aromas and/or tastes can be included as part of the game play on these other gaming systems. These other gaming platforms can be configured to communicate with the apparatus for making scents, smells, odors, aromas and/or tastes and as game programs run on the gaming system those programs can send instructions to the apparatus for making scents, smells, odors, aromas and/or tastes. These instructions can cause the apparatus to make a desired scent, smell, odor, aroma, and/or taste by combining the needed components from the component library, followed by volatilization of the composition into vapors and/or aerosols. These vapors and aerosols are delivered to the game user by the delivery mechanism of the apparatus for making scents, smells, odors, aromas and/or tastes.

In general, the apparatus for making scents, smells, odors, aromas and/or tastes can be combined with other entertainment platforms (television, music systems, etc.) to enhance the user experience with these platforms. For example, music or television programs can include scents, smells, odors, aromas and/or tastes as part of their output. A television program or music soundtrack can include instructions for the apparatus for making scents, smells, odors, aromas and/or tastes that instructs the apparatus to make a desired scent, smell, odor, aroma and/or taste at a desired time so that the auditory and/or visual stimuli of the entertainment are enhanced by desired scents, smells, odors, aromas and/or tastes.

The apparatus for making scents, smells, odors, aromas and/or tastes can also be used to make an Aromascape for use, for example, in stores (e.g., marketing), home or work environments, vehicles, learning/teaching venues (e.g., schools, training facilities, etc.), and recreation venues (e.g., gyms, theatres, arcades, amusement parks, casinos). Aromascapes can be designed to cause desired responses (e.g., emotional and/or cognitive) from subjects (e.g., people or livestock) in a particular environment. For example, an Aromascape in a store display can be designed to attract consumers and enhance the desired response (e.g., happiness/well-being, awe/sensuality, soothing/peacefulness, energizing/refreshing, delicacy, healthiness, and/or a combination of the foregoing) to the goods being displayed. An Aromascape in a supermarket or restaurant can be designed to attract consumers and enhance desired responses to particular goods offered for sale, or enhance the perception of service received by a customer. An Aromascape for use at home could be designed to relax, excite, or enhance other desired responses in the home. An Aromascape in a gym could be designed to enhance physical exertion by the gym members. An Aromascape for an amusement park could be designed to enhance the sensory perception of a ride or interactive show or multi-media performance. An Aromascape ire a vehicle can be designed to enhance driver alertness and to combat drowsiness. An Aromascape in school and/or training facility can increase concentration and uptake of information by students or other persons. Aromascapes can also be designed to change over time, for example, on an hourly, daily, weekly, monthly or seasonal basis. The change ire Aromascape over time can reflect changes in a subject's response to the Aromascape at different times of day, days of the week, days in a month, or days in different seasons.

A work Aromascape can be designed to enhance work satisfaction and productivity. For example, positive mood is linked to an increase in productivity, performance and the tendency to help others. People exposed to the smells of baking cookies, roasting coffee, and other pleasing smells can be more inclined to help others. People who work in the presence of a pleasant smelling air freshener also report higher self-efficacy, set higher goals and were more likely to employ efficient work strategies than participants who worked in a no-odor condition. Pleasant ambient odors have also been found to enhance vigilance during a tedious task and improve performance with word completion tests. Conversely, the presence of a malodor reduced participant's subjective judgments and lowered their tolerance for frustration. Aromascapes in the work place can be micro-Aromascapes (e.g., individual work stations or offices) or an Aromascape for a room or a floor with multiple work spaces. The micro-Aromascape or Aromascape for multiple workspaces can be made by the apparatus using compositions that produce a desired response in a group of subjects with varying demographic backgrounds (e.g., a composition with multiple odorants that produce the same or similar response in subjects of different backgrounds). Alternatively, micro-Aromascapes can be custom made for individual workstations or offices using the demographic information of the occupant of the workspace or office.

Aromascapes made by the apparatus for making scents, smells, odors, aromas and/or tastes can be used in real estate to market homes. For example, the apparatus for making scents, smells, odors, aromas and/or tastes can produce a desired Aromascape in a home during an open house. The desired Aromascape can be one that relaxes people and makes them feel comfortable in a space, or the Aromascape can be designed to excite people about the home, or etc. The Aromascape used can be designed to produce the desired response in subjects having a desired demographic background. Alternatively, the Aromascape can be designed to produce the same or similar response in subjects of different backgrounds using a composition that contains multiple odorants where different odorants produce the desired response in different groups of subjects (sharing different demographic characteristics).

The apparatus for making scents, smells, odors, aromas and/or tastes can also be used for handling livestock, or other nonhuman animals. A desired Aromascape may depend on the activity which the livestock are undertaking. For example, Aromascapes may make the livestock docile and relaxed, or hungry, etc. In an aspect, the livestock can be prepared to have the desired response to the odorant by exposing the young livestock to the odorant when the livestock are experiencing an environment that produces the desired response. For example, when the young livestock are being fed they could be exposed to an odorant so that the livestock associate eating with the odorant.

The apparatus for making scents, smells, odors, aromas and/or tastes can be used alone or in combination with a VR or other system to suppress appetite. The apparatus and VR system can expose the user to a setting with scents, smells, odors, and/or aromas that suppress the appetite of the subject. When a subject is hungry they can use the VR system with the apparatus to curb and suppress their appetite. A VR display combined with appropriate scents, smells, odors, aromas and/or tastes can be designed that counteracts hunger in a subject. When a subject experiences the VR display with its scents, smells, odors, aromas and/or tastes, the subject will lose their appetite.

The apparatus for making scents, smells, odors, aromas and/or tastes can also be used to design custom smells or scents for branding consumer products. A scent, smell, odor, aroma, and/or taste can be designed by using the method for making a scent, smell, odor, aroma, and/or taste to interact with a desired set of Olfactory Receptors to produce a desired subject response (e.g., happiness/well-being, awe/sensuality, soothing/peacefulness, energizing/refreshing, delicacy, healthiness, and/or a combination of the foregoing). This designed scent, smell, odor, aroma, and/or taste can be used to brand a consumer (or other) product. The designed scent, smell, odor, aroma, and/or taste can also enhance the user experience with the consumer (or other) product by causing the olfactory response that reinforces the desired user experience with the product. The designed scent, smell, odor, aroma, and/or taste can be designed to produce the desired response in subjects having a desired demographic background. Alternatively, the designed scent, smell, odor, aroma, and/or taste can be designed to produce the same or similar response in subjects of different backgrounds using a composition that contains multiple odorants where different odorants produce the desired response in different groups of subjects (sharing different demographic characteristics).

The apparatus for making scents, smells, odors, aromas and/or tastes can be used to mask the presence of people (e.g., soldiers), animals (e.g., pets), odors, etc. The masking of people can prevent animals (e.g., search dogs, predators, etc.) or people from sensing the presence of another person.

The inventions disclosed herein will be better understood from the experimental details which follow. However, one skilled in the art will readily appreciate that the specific methods and results discussed are merely illustrative of the inventions as described more fully in the claims which follow thereafter. Unless otherwise indicated, the disclosure is not limited to specific procedures, materials, or the like, as such may vary. It is also to be understood that the terminology used herein is for the purpose of describing particular embodiments only and is not intended to be limiting.

EXAMPLES

Example 1: Making a Scent, Smell, Odor or Aroma

A product's brand can be closely tied to its trademark scent. When a component of that product must be replaced (e.g., found to be harmful, no longer available, too expensive), the manufacturer can use the Aromagraph database and a Closeness Match Algorithm to find candidate odorants which have the closest olfactory profile to the element that is being replaced. These candidates can be used to reformulate the product and retain the well-known brand scent.

The closeness match algorithm compares the desired Aromagraph to Aromagraphs for potential substitute components (including, optionally, antagonists and/or allosteric regulators) and finds the component with the closest Aromagraph to the component being replaced. The closeness match algorithm compares the signal associated with Olfactory Receptors as an absolute value and/or relative values (compared to a standard and/or compared to other Olfactory Receptor signals in the Aromagraph) for the desired Aromagraph and the Aromagraph of a component and/or odorant.

A desired Aromagraph can be compared to components and/or odorants in a library to find the components and/or odorants that will most closely mimic the signals in the desired Aromagraph.

Example 2: Gaming System with Apparatus for Making a Scent, Smell, Odor or Aroma A gaming system embodiment can use a headset as those described in U.S. Design Pat. Nos. D749,5835 (VR headset) or D771,6255 (VR headset with earphones). The VR headset can be configured with a cannula tubing that connects to the apparatus for making a scent, smell, odor, aroma, and/or taste. The apparatus for making a scent, smell, odor, aroma, and/or taste is also in communication with the gaming platform which can be the headset itself, or can be computer and/or gaming console.

Be computer running the content program communicates with the apparatus for making a scent, smell, odor, aroma, and/or taste and instructs it to make scents, smells, odors and/or aromas while the content is being experienced by the user so that scents, smells, odors, and/or aromas are presented to the user to enhance the experience with the content (e.g., game play) The content program can include an option for altering the scent, smell, odor, and/or aroma presented by the apparatus for making a scent, smell, odor, aroma, and/or taste according to the demographics of the user. The apparatus for making a scent, smell, odor, aroma, and/or taste can receive instructions from the computer or game console to present a scent, smell, odor, or aroma to the user that will provoke a particular response. The apparatus for making a scent, smell, odor, aroma, and/or taste will interpret such instructions, optionally using the demographic information input into the apparatus by the user, and present a scent, smell, odor, and/or aroma most likely to provide the response requested by the content program. When the apparatus uses the demographic information a composition can be presented to the user which will cause a desired response. When the apparatus operates without the demographic information, a more complex mixture of components and/or odorants is made that can cause the desired response across a population of users with different demographic characteristics (e.g., a common response to different components and/or odorants which different components and/or odorants are made into one mixture).

Example 3: Appetite Suppression Using the Apparatus for Making a Scent, Smell, Odor or Aroma The apparatus for making a scent, smell, odor, aroma, and/or taste can be programmed to make a series of scents, smells, odors, and/or aromas that suppress appetite. The scents, smells, odors, and/or aromas presented in an environment can change with the time of day to create an environment in which the user's appetite is suppressed. For example, the environment can be a room in a house or other building (e.g., a library) and the scent, smell, odor, and/or scent introduced by the apparatus for making a scent, smell, odor, aroma, and/or taste inhibits appetite so that users of the room do not feel hungry and eat less food in the room. In addition, a subject that is dieting can go into the room and experience less hunger and desire to eat while in this room.

Alternatively, the apparatus for making a scent, smell, odor, aroma, and/or taste can be programmed to introduce scents, smells, odors, and/or aromas into the room that reduce stress and anxiety to suppress eating related to emotional and stress states. For example, lemon, cucumber, and/or peppermint can improve mood and emotional state and can reduce stress and emotion related eating. The apparatus for making a scent, smell, odor, aroma, and/or taste can be programmed to make these scents or smells at certain times of the day that the user correlates with their most common times for stress and emotion related eating. When the apparatus operates without the demographic information, a more complex mixture of components and/or odorants can be made that causes appetite suppression across a population of users with different demographic characteristics (e.g., different subjects experience appetite suppression to different components and/or odorants which different components and/or odorants are made into one mixture).

The apparatus for making a scent, smell, odor, aroma, and/or taste can also be programmed by the user with the user's demographic information and the apparatus can make scents, smells, odors, and/or aromas that are associated with a reduced appetite response for persons of those demographics. For example, the apparatus for making a scent, smell, odor, aroma, and/or taste could make scents, smells, odors, and/or aromas that increase alertness and reduce anxiety and stress.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

Those skilled in the art will recognize, or be able to ascertain using no more than routine experimentation, many equivalents to the specific embodiments of the invention described herein. Such equivalents are intended to be encompassed by the following claims.

We claim:

1. A method for predicting a response of a subject to a composition comprising; generating a first Aromagraph based on the binding of a plurality of olfactory receptor biosensors to the composition, the composition having an odor;

comparing the first Aromagraph to a database comprising a plurality of second Aromagraphs, wherein each of the plurality of second Aromagraphs is associated with a predetermined response to the odor from a panel of subjects; and predicting the response of the subject to the composition based on the comparison.

2. The method of claim 1, wherein the plurality of olfactory receptor biosensors comprises a mammalian olfactory receptor.

3. The method of claim 1, wherein the composition comprises a solution or a suspension.

4. The method of claim 1, wherein the composition comprises an aerosol or a vapor.

5. The method of claim 1, wherein the composition comprises a solid.

6. The method of claim 1, wherein the predicted response is the same as the predetermined response.

7. The method of claim 1, wherein the predicted response is different from the predetermined response.

8. The method of claim 1, wherein the predetermined response is happiness, well-being, peacefulness, relaxation, or a combination thereof.

9. The method of claim 1, wherein the predetermined response is stimulation, invigoration, refreshment, or a combination thereof.

10. The method of claim 1, wherein the predetermined response is disgust, irritation, unpleasantness, nauseating, or a combination thereof.

11. The method of claim 1, wherein the database further comprises demographic information associated with each of the plurality of second Aromagraphs.

12. The method of claim 11, wherein the demographic information comprises age, race, nationality, income, geographic location, sex, or a combination thereof.

13. The method of claim 1, wherein the database measures the level of the predetermined response associated with the plurality of second Aromagraphs.

14. A method for selecting and making a composition that generates a desired response comprising:

generating a Aromagraph or group of Aromagraphs based on one or more responses from a subject or a plurality of subjects to the combination of odorants;

storing the Aromagraph or group of Aromagraphs in a cloud based database;

identifying the desired response in a subject;

identifying an odorant that produces the desired response;

accessing the cloud based database using a wireless communication system to select an Aromagraph associated with the desired response from the cloud based database of the Aromagraph or group of the Aromagraphs; wherein each Aromagraph in the database is based on the binding of a plurality of olfactory receptor biosensors to the odorant in the composition, the database further comprises demographic information associated with the Aromagraph; and identifying a composition comprising the odorant that matches the selected Aromagraph, and making the identified composition using a materials handling system to combine the combination of odorants into the composition.

15. The method of claim 14, wherein the plurality of olfactory receptor biosensors comprises a mammalian olfactory receptor.

16. The method of claim 14, wherein the composition comprises a solution or a suspension.

17. The method of claim 14, wherein the composition comprises an aerosol or a vapor.

18. The method of claim 14, wherein the composition comprises a solid.

19. The method of claim 14, wherein the desired response is happiness, well-being, peacefulness, relaxation, or a combination thereof.

20. The method of claim 14, wherein the desired response is stimulation, invigoration, refreshment, or a combination thereof.

21. The method of claim 14, wherein the database measures the level of the desired response associated with the Aromagraph.

22. The method of claim 14, wherein the demographic information comprises age, race, nationality, income, geographic location, sex, or a combination thereof.

23. The method of claim 14, wherein the desired response is associated with an odor.

24. The method of claim 14, wherein the desired response is associated with a taste.

25. The method of claim 24, wherein the taste is sweet, bitter, salty, sour, umami, or a combination thereof.

26. The method of claim 14, wherein the materials handling system comprises % f % robotic system, a fluidics system, or a combination thereof.

27. The method of claim 14, wherein making the identified composition further comprising a mixing system that combines the components received from the handling system into a composition; and a system for volatilizing the composition received from the mixing system.

28. A method for selecting and making a composition for use in a virtual reality systems, comprising the method of claim 14.

* * * * *